(12) United States Patent
Petropulu et al.

(10) Patent No.: US 11,943,038 B2
(45) Date of Patent: Mar. 26, 2024

(54) RELAY BEAMFORMING WITH PREDICTIVE RELAY SELECTION FOR MILLIMETER WAVE COMMUNICATIONS

(71) Applicant: Rutgers, The State University of New Jersey, New Brunswick, NJ (US)

(72) Inventors: Athina Petropulu, New Brunswick, NJ (US); Anastasios Dimas, New Brunswick, NJ (US); Dionysios Kalogerias, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 17/352,584

(22) Filed: Jun. 21, 2021

(65) Prior Publication Data
US 2021/0399788 A1    Dec. 23, 2021

Related U.S. Application Data (60) Provisional application No. 63/041,479, filed on Jun. 19, 2020.

(51) Int. Cl.
H04B 7/155 (2006.01)
H04B 7/06 (2006.01)
H04W 84/04 (2009.01)

(52) U.S. Cl.
CPC ....... H04B 7/15507 (2013.01); H04B 7/0617 (2013.01); *H04W 84/047* (2013.01)

(58) Field of Classification Search
CPC .. H04B 7/15507; H04B 7/0617; H04B 7/026; H04B 7/2606; H04W 84/047
See application file for complete search history.

(56) References Cited

U.S. PATENT DOCUMENTS

| 8,634,763 B2 | 1/2014 | Oyman et al. |
| 9,516,574 B2 | 12/2016 | Kwon et al. |
| 2014/0217895 A1 | 9/2014 | Shattil |
| 2017/0277707 A1* | 9/2017 | Boudreau ............... H04B 7/06 |

(Continued)

FOREIGN PATENT DOCUMENTS

WO    2017185979 A1    11/2017

OTHER PUBLICATIONS

Kalogerias et al "Spatially Controlled Relay Beamforming" IEEE Transactions on Signal Processing, vol. 66, Issue 24, Dec. 15, 2018 (Year: 2018).*

(Continued)

*Primary Examiner* — Ian N Moore
*Assistant Examiner* — Sun Jong Kim
(74) *Attorney, Agent, or Firm* — MEAGHER EMANUEL LAKS GOLDBERG & LIAO, LLP

(57) ABSTRACT

Systems, methods, architectures, mechanisms and apparatus for relay beamforming of mmWave communications in an environment having signal blockage and signal attenuation challenges, such as found in an urban setting support distributed, relay-assisted beamforming mechanisms that exploit the spatial diversity of mmWave signal propagation, including a resource efficient relay selection scheme designed to optimally enhance QoS in 2-hop Amplify-and-Forward (AF) cooperative networks. Relay selection is implemented in a predictive and distributed manner.

19 Claims, 4 Drawing Sheets

(56) References Cited

U.S. PATENT DOCUMENTS

2018/0234157 A1    8/2018  Liang et al.
2019/0356381 A1   11/2019  Gharavi et al.
2022/0264321 A1*   8/2022  Huang ................ H04W 72/046

OTHER PUBLICATIONS

Ho et al "A near-optimal broadcast technique for vehicular networks," 2009 Wireless Telecommunications Symposium, 2009, pp. 1-8. (Year: 2009).*

Kalogerias et al "Spatially controlled relay beamforming: 2-stage optimal policies," 2017 (Year: 2017).*

Abdelreheem et al., "Deep Learning-Based Relay Selection in D2D Millimeter Wave Communications", 2019 International Conference on Computer and Information Sciences (ICCIS), pp. 1-5, 2019.

\* cited by examiner

Algorithm 1 Joint Beamforming & Relay Selection Scheme

1: for $t = 1 : N_T$ do
2:     Beamforming (2nd stage of time slot $t$)
3:     Inputs: Channel aggregates $|\mathbf{1}^T \mathbf{f}_r|^2$ and $|\mathbf{1}^T \mathbf{g}_r|^2$
4:     Compute optimal $\mathbf{w}_{opt}(t)$ from (28)
5:     Relay selection (1st stage of time slot $t + 1$)
6:     for every cluster $r$ do
7:         Inputs: a) RSS $\{z_\tau(t)\}_{\tau \in \mathcal{S}_t \cup \mathcal{S}_t^p}$ until $t$
8:                 b) RSS $z_{\tau_r}^f(t)$ and $z_{\tau_r}^g(t)$ until $t$
9:         Generate $\bar{S}$ from (56)
10:        for each $\mathbf{p} \in \mathscr{C}_r(t)$ do
11:            Compute $\hat{V}_I(\mathbf{p}, t + 1)$ from (57)
12:        end for
13:        Choose $\mathbf{p}_r(t + 1) \in \arg\max_{\mathbf{p} \in \mathscr{C}_r(t)} \hat{V}_I(\mathbf{p}, t + 1)$
14:     end for
15: end for

FIG. 4

510 — DURING AN INITIAL PORTION OF A CURRENT FIRST OR NTH TIME SLOT $T$, ESTIMATE CSI ASSOCIATED WITH A CURRENTLY SELECTED RELAY AND CSI ASSOCIATED WITH NETWORK SEGMENTS TRAVERSED BY THE RECEIVED SIGNAL

520 — DURING A SUBSEQUENT PORTION OF THE CURRENT TIME SLOT $T$, PARTICIPATING IN THE BEAMFORMING AT THE CURRENTLY SELECTED RELAY USING BEAMFORMING WEIGHTS DETERMINED IN ACCORDANCE WITH A CORRESPONDING CONTRIBUTION TO EXPECTED SINR OF A CURRENT TIME SLOT SIGNAL RECEIVED AT THE DESTINATION NODE

530 — DURING THE SUBSEQUENT PORTION OF THE CURRENT FIRST OR NTH TIME SLOT $T$, SELECT A RELAY FOR A NEXT TIME SLOT $T+1$ IN ACCORDANCE WITH CSI ESTIMATIONS ASSOCIATED WITH A MMSE PREDICTOR OF A NEXT TIME SLOT SIGNAL RECEIVED AT THE DESTINATION NODE

- 531 — USING THE OBTAINED ESTIMATES OF PHASE 1 (STEP 510) AND THE ACCUMULATED CSI FROM ALL (OR SOME) PREVIOUS TIME SLOTS, GENERATE FROM THE DISTRIBUTION OF EQUATION (56) $N_S$ SAMPLES OF VECTOR $S$.
- 532 — FOR EACH RELAY OF THE CLUSTER:
  (1) COMPUTE THE OPTIMAL SINR (EQ. (53)) USING THE GENERATED $N_S$ SAMPLES; AND
  (2) EVALUATE THE EMPIRICAL MEAN OF THE $N_S$ VALUES (EQ. (57))
- 533 — CHOOSE THE RELAY THAT YIELDS THE LARGEST VALUE

RELAY BEAMFORMING WITH PREDICTIVE RELAY SELECTION FOR MILLIMETER WAVE COMMUNICATIONS

CROSS-REFERENCE TO RELATED APPLICATION

This application claims priority to U.S. Provisional Patent Application No. 63/041,479 filed on Jun. 19, 2020 entitled RELAY BEAMFORMING WITH PREDICTIVE RELAY SELECTION FOR MILLIMETER WAVE COMMUNICATIONS, which application is incorporated herein by reference in its entirety.

STATEMENT REGARDING FEDERALLY SPONSORED RESEARCH OR DEVELOPMENT

This invention was made with government support under grant number 1526908 awarded by the National Science Foundation. The government has certain rights in the invention.

FIELD OF THE DISCLOSURE

The present disclosure generally relates to wireless communications, in particular, to an improved relaying of millimeter wave (mmWave) communications such as in an urban setting.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

While millimeter wave (mmWave) communications are expected to provide very high data rates within 5G networks, their sensitivity to blockage and severe signal attenuation present deployment challenges in, for example, urban settings. One way to mitigate this problem and increase communication range is the use of relaying techniques in combination with beamforming techniques. However, relay-assisted beamforming requires a relay selection process that is resource demanding and introduces network latency.

Support of outdoor mmWave wireless communications in an urban setting may be provided by deploying a dense network of base stations configured to optimize city-wide Line-of-Sight (LoS) coverage. However, optimizing the LoS coverage rate does not necessarily guarantee quality-of-service (QoS) to end users, and can possibly cause interference between the base station transmissions.

SUMMARY

Various deficiencies in the prior art are addressed by systems, methods, architectures, mechanisms and apparatus for relay beamforming of mmWave communications in an environment having signal blockage and signal attenuation challenges, such as found in an urban setting. The various embodiments support distributed, relay-assisted beamforming mechanisms that exploit the spatial diversity of mmWave signal propagation, including a resource efficient relay selection scheme designed to optimally enhance QoS in 2-hop Amplify-and-Forward (AF) cooperative networks. Relay selection is implemented in a predictive and distributed manner, with some embodiments also employing predictive schemes to optimally select transmitting relays.

Various embodiments contemplate a system comprising static relays deployed in clusters along and across streets such as in an urban setting, wherein each cluster selects a representative relay to forward toward a destination node a signal received from a source node. At each cluster and for each time slot t, a respective estimation is made of Channel State Information (CSI) associated with a currently selected relay and CSI associated with network segments traversed by the signal between the source node and the currently selected relay. During the time slot t, each cluster selects a representative relay for a next time slot t+1 in accordance with respective magnitude CSI estimations associated with a maximized minimum mean square error (MMSE) predictor of a next time slot Signal-to-Interference+Noise Ratio (SINR), $V(t+1)$, at the destination node. Also during the time slot t, the currently selected relay of each cluster performs respective beamforming using beamforming weights determined in accordance with a corresponding contribution to expected SINR of a current time slot at the destination node.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments provide a relay-assisted beamforming approach for mmWave communications in an urban scenario, and a resource efficient relay selection scheme designed to optimally enhance QoS in 2-hop Amplify-and-Forward (AF) cooperative networks. By exploiting the correlation structure of the channel induced by shadowing, a phenomenon prominent in mmWave communications, the inventors devise mechanisms to reduce both latency and CSI estimation overhead. AF is adopted herein as it is the simplest forwarding scheme, and of minimal implementation complexity. Other, possibly more involved forwarding schemes may also be utilized within the context of the various embodiments.

Figure 1:
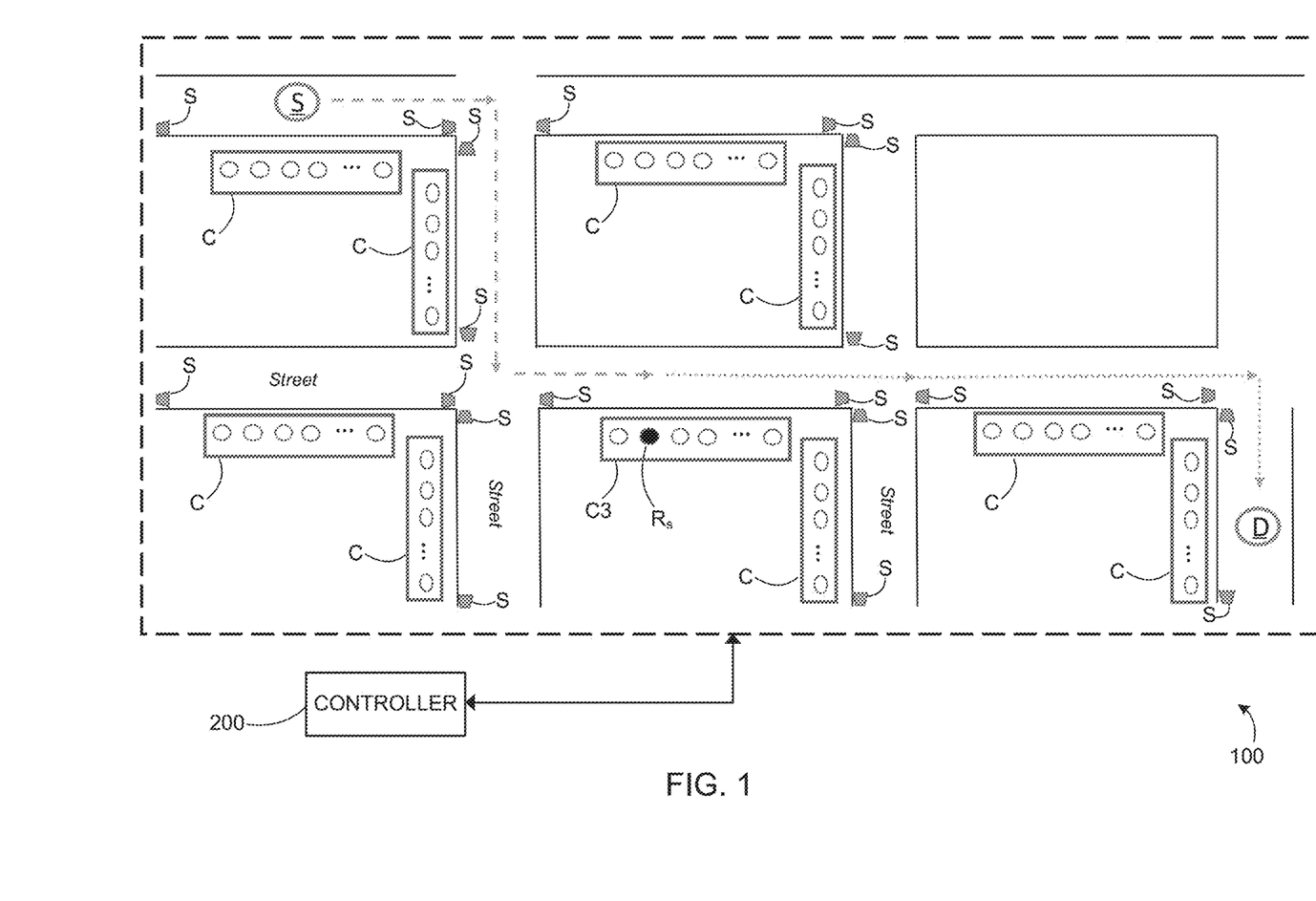
FIG. 1 graphically depicts a simplified network deployment example useful in understanding the various embodiments.

FIG. 1 graphically depicts a simplified network deployment example useful in understanding the various embodiments. Specifically, FIG. 1 depicts a plurality of city blocks defined by streets and buildings in the normal manner, wherein clusters C of relays R form respective communications nodes which are deployed across certain street segments and configured to beamform a signal received from a source node S toward a destination node D. A dashed line depicts all mmWave signal propagation paths from the source S to the destination D, passing through a relay cluster C3. It is noted that relay cluster C3 is depicted as receiving the signal from the source node S and having a currently selected relay Rs which has been configured for beamforming/forwarding the signal toward the destination node D. Each of the nodes (i.e., each cluster C of relays R) is associated with a respective location that may be defined using street addresses such as from city/area mapping data, global positioning system (GPS) coordinates, or other location defining means.

For simplicity of this discussion it is assumed that each cluster C contains R evenly spaced relays. However, the various embodiments discussed herein are suitable for use with any spatial relay distribution and/or relay quantity within any cluster. At each time instance, only one relay from every cluster, namely, the cluster representative, is active. The relays are connected via the fiber-optic link or other back channel to computational resources such as at a central node, where information may be exchanged in accordance with the various embodiments. In various embodiments, a propagation path between the source or destination and any of the cluster representatives, as well as the corresponding line-of-sight (LoS) and non-line-of-sight (NLoS) portions of the path, may be configured/operational in the manner described herein with respect to the various relay clusters.

The various embodiments utilize a relay-assisted beamforming for mmWave communications in an urban scenario, which exploits the shadowing-induced correlation structure of the channel to reduce both latency and CSI estimation overhead. In particular, one relay from each cluster is optimally selected at each time slot to participate in optimal beamforming at the next time slot. This relay selection is implemented in a predictive and distributed manner, by exploiting channel correlations and by using past and present measurements of magnitude CSI. As a result, at each time slot, optimal beamforming based on relays selected in the previous slot and optimal predictive relay selection for the next time slot are implemented completely in parallel. This parallelization eliminates delays induced by sequential execution of relay selection and beamforming, and substantially reduces CSI estimation overhead. Simulations confirm that the proposed relay selection scheme outperforms any randomized selection policy, while, at the same time, achieves comparable performance to an ideal selection scheme that relies on perfect CSI estimates for all candidate relays.

The system 100 of FIG. 1, as well as the various embodiments discussed herein, will be described as a 2-hop Amplify-and-Forward (AF) cooperative network. AF is the least resource-demanding forwarding scheme, and it offers a closed form solution. However, various embodiments may also be implemented using Decode-and-Forward (DF). By exploiting the correlation structure of the channel, induced by a phenomenon that is prominent in mmWave communications, caused by large objects in the path of the propagating signal (i.e., shadowing) the various embodiments operate to predict CSI magnitude in time and space, and thus reduce both latency and CSI estimation overhead. The various embodiments provide joint optimal relay selection and distributed cooperative beamforming that maximizes the expected Signal-to-Interference plus Noise Ratio (SINR) at the destination, and under power constraints. In particular, assuming a time-slotted system operation, one relay from each cluster is optimally selected at each time slot to participate in optimal beamforming at the next time slot. An execution method suitable for use at each cluster is described in more detail below with respect to FIG. 5.

Assuming a time slotted system operation, various embodiments optimize QoS in a 2-stage fashion, where, in every time slot, and simultaneously with AF beamforming to the destination, each cluster predictively selects a cluster representative (1st stage) to optimally enhance AF beamforming at the subsequent time slot (2nd stage). As a result, at each time slot, optimal beamforming based on relays selected in the previous slot and optimal predictive relay selection for the next time slot are implemented completely in parallel.

Predictive relay selection is achieved by exploiting channel correlations with current and past networkwide magnitude-only CSI (also known as Received Signal Strength (RSS)) which is invariant to relay cluster size and is measured sequentially during the operation of the system. This combination of cooperative beamforming and relay selection, which together comprise the proposed 2-stage problem formulation, presents distinct operational advantages over the trivial ideal scheme, stemming directly from the predictive nature of the approach.

This parallelization eliminates delays induced by sequential execution of relay selection and beamforming, and substantially reduces CSI estimation overhead. Simulations confirm that the proposed relay selection scheme outperforms any randomized selection policy, while, at the same time, achieves comparable performance to an ideal selection scheme that relies on perfect CSI estimates for all candidate relays.

Figure 2:
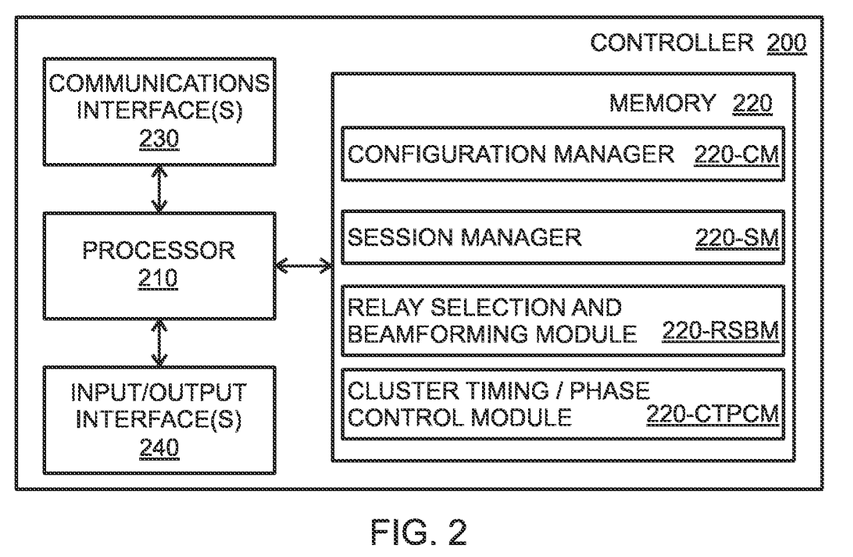
FIG. 2 depicts a high-level block diagram of a computing device configured for implementing a controller function according to one embodiment.

FIG. 2 depicts a high-level block diagram of a computing device configured for implementing a controller function according to one embodiment and suitable for use in performing the various functions as described herein. It will be appreciated that the controller function described herein may be located within the network 100 of FIG. 1, proximate a particular element within the network 100 and so on.

As depicted in FIG. 2, computing device 200 includes a processor element 210 (e.g., a central processing unit (CPU) or other suitable processor(s)), a memory 220 (e.g., random access memory (RAM), read only memory (ROM), and the like), a communications interface 230 (e.g., one or more interfaces enabling communications via a wireless communication network such as a 3G/4G/LTE/5G wireless network, an optical fiber link and the like), and an optional input/output interface 240 (e.g., GUI delivery mechanism, user input reception mechanism, web portal interacting with remote workstations and so on).

It will be appreciated that computing device 200 depicted in FIG. 2 provides a general architecture and functionality suitable for implementing functional elements described herein or portions of the functional elements described herein.

It will be appreciated that the functions depicted and described herein may be implemented in hardware or in a combination of software and hardware, e.g., using a general purpose computer, one or more application specific integrated circuits (ASIC), or any other hardware equivalents. In one embodiment, computer instructions are loaded into memory 220 and executed by processor 210 to implement the functions as discussed herein. The various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

The communications interface 230 facilitates communications with various elements within or related to the network 100 of FIG. 1, such as various clusters C of relays R, channel sounders S and other devices (not shown) that may be implemented within the context of a mmWave network such as described herein. In various embodiments, the communications interface 230 facilitates high-speed communications with the various millimeter wave network elements to enable the controller 200 to provide rapid management of these elements.

The memory 220 is depicted as storing computer instructions executable by the processor 210 to implement various functions associated with the network 100 of FIG. 1, such a configuration manager 220-CM, a session manager 220-SM, a relay selection and beamforming module 220-RSBM, and (optionally) a cluster timing/phase control module 220-CTPCM.

The configuration manager 220-CM is used to manage the various elements of the network 100 of FIG. 1 as needed. Such elements may comprise base stations, eNodeBs, relays, relay clusters, nodes, sounders and so on.

The session manager 220-SM is configured to manage network services sessions supported by the network 100 of FIG. 1 as needed. Such sessions may be associated with voice, video, data, and/or other types of network services.

The relay selection and beamforming module 220-RSBM operates to select appropriate relays within the various relay clusters for use in forwarding a signal, as well as determining the beamforming characteristics to be used in forwarding that signal. The various functions associated with the relay selection and beamforming module 220-RSBM will be described in more detail below with respect to the various embodiments.

The cluster timing/phase control module 220-CTPCM supports cluster timing and/or phase control mechanisms suitable for use in enabling the various clusters C within the network 100 to modify local timing/phase parameters (e.g., of a local oscillator) such that the various clusters C (and relays R therein) operate in a synchronized manner. In various embodiments this module generates timing signals suitable for use by the clusters and/or relays to adapt local oscillator operation such that local timing errors may be reduced or eliminated. Such timing signals may be propagated via a communications interface 130, such as by using timestamps, reference signals and so on. Different mechanisms are contemplated by the inventors.

As depicted above with respect to FIG. 1, a system model according to various embodiments comprises static relays deployed in clusters across streets. Each cluster is defined within an area over which the channel exhibits similar statistical characteristics. This is typical in mmWave networks, which are primarily designed for relatively short distance point-to-point communications. Assuming a time-slotted system operation, the proposed scheme optimizes QoS in a 2-stage fashion, where, in every time slot, and simultaneously with AF beamforming to the destination, each cluster predictively selects a representative relay (1st stage) to optimally enhance AF beamforming at the subsequent time slot (2nd stage). Predictive relay selection is achieved by exploiting channel correlations with current and past networkwide magnitude-only CSI (also known as Received Signal Strength (RSS)) which is invariant to relay cluster size, and is measured sequentially during the operation of the system. This combination of cooperative beamforming and relay selection, which together comprise the proposed 2-stage problem formulation, presents distinct operational advantages over the trivial ideal scheme, stemming directly from the predictive nature of the approach.

As discussed herein, network QoS is quantified by the expected Signal-to-Interference+Noise Ratio (SINR) at the destination, which is a standard performance metric. One of the communications goals is to maximize that expected SINR, subject to a shared power constraint among all relay clusters. Therefore, in various embodiments the optimal beamforming weights need to be computed centrally for all clusters. Nevertheless, the proposed relay selection procedure is conducted in a completely distributed manner; each cluster independently decides its successor representative for the subsequent time slot by solving a simple local stochastic optimization problem, without the need for inter-cluster information exchange.

It is noted that the diversity resulting from the reflective nature of the mmWave signal propagation, as well as the possibly street-wise varying channel parameters, induce significant differences as far as both problem description and development of corresponding efficient implementation techniques are concerned.

Various embodiments provide distributed cooperative beamforming for expected SINR maximization in mmWave networks. The disclosed beamforming formulation allows for efficient exploitation of the spatial diversity induced by dominant mmWave propagation paths, which is a consequence of the spatial propagation patterns of the mmWave medium. The CSI induced by the mmWave propagation paths is optimally combined constructively at the destination, resulting in superior network QoS, without the disadvantages of multi-hop relaying. Although distributed beamforming is a well established technique for exploitation of spatial diversity in free-space communications, the various embodiments described herein utilize beamforming within the context of urban mmWave networks, which are inherently topologically distinct as compared to the free-space setting. Indeed, the spatial structure of the mmWave medium is explicitly reflected in the adopted mmWave channel model, as well as in the form of the optimal beamforming weights and achieved network SINR. In particular, the channel model extends the state of the art by introducing a new channel correlation kernel for effectively modeling the statistical dependencies among the involved source-relay and relay-destination channels; such dependencies do not appear in free-space channel modeling.

As briefly mentioned above, within each time slot, the implementation of the proposed relay selection scheme is completely decoupled from that of optimal beamforming. This is due to the predictive nature of the proposed scheme, which determines the best cluster representative before the start of each time slot. Consequently, in a given slot, optimal beamforming and optimal predictive relay selection for the next slot can be performed in parallel, as one does not depend on the other. This parallelism results in improved time slot utilization. Additionally, as predictive selection is implemented solely based on past channel measurements, significant reduction of CSI estimation overhead per time slot is achieved as compared to the respective ideal scheme, with the reduction being more pronounced as the relay density per cluster increases. This is particularly important in mmWave networks, where dense infrastructure is essential for achieving satisfactory performance.

Generally speaking, the various embodiments provide a novel, practical and computationally efficient technique for implementing the disclosed relay selection scheme. Specifically, the local stochastic problem each cluster is responsible for is replaced by a surrogate based on Sample Average Approximation (SAA), which relies on predictive Monte Carlo sampling of the channel uncertainty involved. Heavily appealing to the statistical structure of the adopted mmWave channel model, the proposed technique efficiently exploits spatiotemporal correlations of the mmWave medium, and results in easily computable, near-optimal relay selection policies. This is achieved via, illustratively, a well-designed, non-trivial combination of Kalman filtering and Gaussian process regression.

mmWave Urban Channel Model

As previously noted, the various embodiments find particular utility within the context of urban setting. It is noted that the various embodiments may also be used within the context of non-urban settings. This section is dedicated to the development of a sufficiently detailed illustrative urban mmWave channel model. This channel model may be applied to any city topology such as one comprising a densely built area with high-rise buildings, separated by non-curved street canyons.

Consider simplified city topologies such as that of FIG. 1, which shows a top view schematic of a particular urban area including road intersections, streets and the like. Due to blockage caused by high-rise buildings, the only way a mmWave signal starting from a source located at $\mathbf{p}_S$ (e.g., S) can reach its destination at $\mathbf{p}_D$ (e.g., D) is by traversing street segments. More specifically, the transmitted signal is spatially diversified through all sets of consecutive, non-repeating segments from the source to the destination. Then, a (dominant) propagation path is defined as every such set of traversed street segments whose aggregate length is equal to the minimum $\ell_1$-distance from the source to the destination. The following conventions used herein: where the Line-of-Sight (LoS) portion of every path is the segment between the transmitting node and the nearest intersection, while the remaining segments comprise the Non-Line-of-Sight (NLoS) portion of the path. All considered paths have common LoS portion, while their NLoS portions differ.

As previously noted, to overcome severe signal attenuation, various embodiments deploy clusters of relays across certain street segments, which will beamform the signal to its destination. For simplicity in exposition, assume that each cluster contains evenly spaced relays. It is noted that the approach works for any spatial relay distribution within each cluster. At each time instance, only one relay from every cluster, namely, the cluster representative, is active. The relays are connected via optical fiber to a central node via which they can exchange information. A propagation path between the source or destination and any of the cluster representatives, as well as the corresponding LoS and NLoS portions of the path are all defined in exactly the same fashion as in the previous paragraph.

Let $N_c$ be the number of available relay clusters C in the network. Also, let $L_r$ be the number of all possible signal paths from $\mathbf{p}_S$ (e.g., S) to relay cluster $r=1, \ldots, N_c$. The channel between $\mathbf{p}_S$ and a relay in cluster r (e.g., Rs) located at $\mathbf{p}$ is experienced as a combination of all channels across all possible paths between $\mathbf{p}_S$ and $\mathbf{p}$. In particular, under the flat fading assumption, the complex channel gain from $\mathbf{p}_S$ to point p along path i can be decomposed as follows:

$$f_{ri}(p, t) \triangleq \underbrace{f_{ri}^{PL}(p)}_{path-loss} \underbrace{f_{ri}^{SH}(p, t)}_{shadowing} \underbrace{f_{ri}^{MF}(p, t)}_{multi-path}, \qquad (1)$$

where $f_{ri}^{PL}(\mathbf{p})$ is the path-loss component, $f_{ri}^{SH}(\mathbf{p}, t)$ the large-scale fading component (shadowing), and $f_{ri}^{MF}(\mathbf{p}, t)$ the small-scale fading component (multi-path). A similar decomposition holds for the channel $g_{ri}(\mathbf{p}, t)$ from $\mathbf{p}$ to $\mathbf{p}_p$, along path $i=1, \ldots, K_r$, where $K_r$ is the number of respective signal paths from cluster r to the destination.

In the mmWave setting, the channel path-loss does not depend on the Euclidean distance between $\mathbf{p}_S$ and $\mathbf{p}$, but rather on their absolute locations (e.g., such as by the "Manhattan distance" or distance between two points measured along axes at right angles), and is therefore parametrized separately for each segment. As previously noted, each of the nodes/clusters $\mathbf{p}$ is associated with a respective location that may be defined using street addresses such as from city/area mapping data, global positioning system (GPS) coordinates, or other location defining means. Let the set of all individually traversed street segments $\tau$ of path i to cluster r be denoted by $\mathcal{S}_{ri}^f$, which includes the segment $\tau_S$ where the source is located, but does not include segment $\tau_r$ where cluster r is located. Similarly, the set of traversed segments of path i from cluster r to the destination, including the segment $\tau_D$ the destination is located but excluding segment $\tau_r$, is $\mathcal{S}_{ri}^g$. In the following, consider only the source-relay channels $f_{ri}$, for every path i associated with cluster r. The discussion for $g_{ri}$ follows in a completely analog manner, and is omitted for brevity.

It is also assume an additional loss $\Delta$ occurring at every intersection, i.e., every propagation path exhibits a total intersection loss $\Delta N_r^f$, where $N_r^f$ are the number of traversed intersections from $\mathbf{p}_S$ to $\mathbf{p}$. Therefore, the overall path-loss component of channel $f_{ri}$ is expressed as $$f_{ri}^{PL}(p) = 10^{-\frac{\Delta N_r^f}{2\cdot 10}} d_{\tau_S}^{-\frac{\alpha_L}{2}} \left(d_{\tau_r}^f(p)\right)^{-\frac{\alpha_N}{2}} \prod_{\tau \in \mathcal{S}_{ri}^f \setminus \{\tau_S\}} d_\tau^{-\frac{\alpha_N}{2}}, \quad (2)$$

where $d_{\tau_S}$ denotes the length of the LoS segment $\tau_S$, $d_{\tau_r}^f(\mathbf{p})$ is the distance between the intersection of segment $\tau_r$ associated with $f_{ri}$ and location $\mathbf{p}$ in $\tau_r$ (that is, the intersection of $\tau_r$ which is $\ell_1$-closest to the source), and $d_\tau$ denotes the length of the $\tau$-th street segment. Assume that a relay cannot be located exactly on an intersection, so $d_{\tau_r}^f \neq 0$.

Likewise, the shadowing and multi-path components of the channel experienced across each path may be decomposed on a per-segment basis as $$f_{ri}^{SH}(p, t) = s_{\tau_r}^f(p, t) \prod_{\tau \in \mathcal{S}_{ri}^f} s_\tau(t) \text{ and} \quad (3)$$

$$f_{ri}^{MF}(p, t) = q_{\tau_r}^f(p, t) \prod_{\tau \in \mathcal{S}_{ri}^f} q_\tau(t), \quad (4)$$

where $s_\tau$ and $q_\tau$ are the shadowing and multi-path terms experienced across segment $\tau$.

Consequently, by expressing the magnitude of (1) in logarithmic scale (dB), then obtain the additive model $$F_{ri}(p, t) \triangleq \quad (5)$$

$$10 \log_{10}\left(\left|f_{ri}^{PL}(p) \cdot f_{ri}^{SH}(p, t) \cdot f_{ri}^{MF}(p, t)\right|^2\right) \triangleq a_{ri}^f(p) + b_{ri}^f(p, t) + c_{ri}^f(p, t)$$

where $$-a_{ri}^f(p) \triangleq \quad (6)$$

$$\alpha_L 10 \log_{10} d_{\tau_S} + \alpha_N \sum_{\tau \in \mathcal{S}_{ri}^f} 10 \log_{10} d_\tau + \alpha_N 10 \log_{10} d_{\tau_r}^f(p) + \Delta N_r^f,$$

$$b_{ri}^f(p, t) \triangleq \quad (7)$$

$$\sum_{\tau \in \mathcal{S}_{ri}^f} 10 \log_{10} |s_\tau(t)|^2 + 10 \log_{10} |s_{\tau_r}^f(p, t)|^2 \triangleq \sum_{\tau \in \mathcal{S}_{ri}^f} \beta_\tau(t) + \beta_{\tau_r}^f(p, t)$$

and $$c_{ri}^f(p, t) \triangleq \quad (8)$$

$$\sum_{\tau \in \mathcal{S}_{ri}^f} 10 \log_{10} |q_\tau(t)|^2 + 10 \log_{10} |q_{\tau_r}^f(p, t)|^2 \triangleq \sum_{\tau \in \mathcal{S}_{ri}^f} \xi_\tau(t) + \xi_{\tau_r}^f(p, t).$$

It should be noted that in the above equations, the combined shadowing components pertaining to segments without relays have been separated from the respective term referring to the segment containing the relay cluster. Those terms exhibit distinct statistical behavior, and will be considered separately.

In addition to the above, for every time slot t, assume a phase term $e^{j2\pi\phi_\tau(t)}$ for each distinct segment $\tau \in \mathcal{S}_{ri}^f$, $r=1, \ldots, N_c$, $i=1, \ldots, L_r$, where each $\phi_\tau(t)$ is uniformly distributed in $[0,1]$. Modeling the phase as a uniformly distributed process and independent of the respective channel magnitude is a standard assumption in the literature, which heuristically follows from the statistical structure of the well-known Rayleigh fading model. Additionally, as phase varies rapidly both in time and space, phase correlations are difficult to capture, therefore model, let alone exploit in statistical prediction. This fact consequently justifies the phase whiteness assumption, in both time and space. Note that phase whiteness is a standard assumption in the literature, and in various contexts. Similarly, for every time slot t and every location $\mathbf{p}$, assume another phase term $\phi_{\tau_r}^f(\mathbf{p}, t)$, also uniformly distributed in $[0,1]$. Across all time slots, all segments, and all locations, all phase components are mutually independent, and also independent of the respective channel magnitudes, as well. Then, the channel $f_{ri}(\mathbf{p}, t)$ can be reconstructed as $$f_{ri}(p, t) = e^{\frac{\ln(10)F_{ri}(p,t)}{20}} e^{j2\pi\Phi_{ri}^f(p,t)}, \quad (9)$$

where $\Phi_{ri}^f(p, t) \triangleq \sum_{\tau \in \mathcal{S}_{ri}^f} \phi_\tau(t) + \phi_{\tau_r}^f(p, t).$ For all segments, assume a log-normal distribution for modeling shadowing and multi-path fading. The channel paths $f_{ri}$, $i=1, \ldots, L_r$, are statistically dependent, as they might traverse common segments. Still, it is reasonable to model all shadowing and multi-path components as being mutually independent across different segments, since each segment will exhibit distinct spatial features.

However, within each segment $\tau \in \mathcal{S}_{ri}^f$, $\beta_\tau(t)$ is assumed to be zero mean and jointly Gaussian in time, with correlation between two time slots k and l given by $$\mathbb{E}[\beta_\tau(k)\beta_\tau(l)] \triangleq \eta^2 e^{-|k-l|/\gamma}, \quad (10)$$

where $\eta^2$ is the shadowing power and $\gamma$ the correlation time. Further assuming that the multi-path component $q_\tau(t)$ is white in time with variance $\sigma_\xi^2$, the combined log-magnitude terms $z_\tau(t) \triangleq \beta_\tau(t) + \xi_\tau(t)$, $t=1, \ldots, N_T$ are jointly Gaussian with mean zero and covariance $$\Sigma_\tau \triangleq \eta^2 \begin{bmatrix} 1 & \cdots & e^{-(N_T-1)/\gamma} \\ \vdots & \ddots & \vdots \\ e^{-(N_T-1)/\gamma} & \cdots & 1 \end{bmatrix} + \sigma_\xi^2 I_{N_T} \quad (11)$$

-continued $$\triangleq \eta^2 T + \sigma_\xi^2 I_{N_T} \in \mathbb{R}^{N_T \times N_T}.$$

Likewise, the term $\beta_{\tau_r}^f(\mathbf{p}, t)$, corresponding to the segment where cluster r is located, is assumed to be jointly Gaussian, both in space and time. Specifically, assume that the individual relays of cluster r can be located at a discrete set of $\delta$ positions across the segment $\tau_r$. At two such positions, say $\mathbf{p}_m$ and $\mathbf{p}_n$, and between any two time slots k and l, the spatiotemporal correlation of $\beta_{\tau_r}(\mathbf{p}, t)$ is defined as:

$$\mathbb{E}\left[\beta_{\tau_r}^f(p_n, k)\beta_{\tau_r}^f(p_m, l)\right] \triangleq K_{FF}(p_n, p_m)e^{-|k-l|/\gamma}, \quad (12)$$

where the spatial kernel $K_{FF}$ is given by $$K_{FF}(p_n, p_m) \triangleq \eta^2 e^{-\|p_n - p_m\|_2/\beta}. \quad (13)$$

Figure 3:
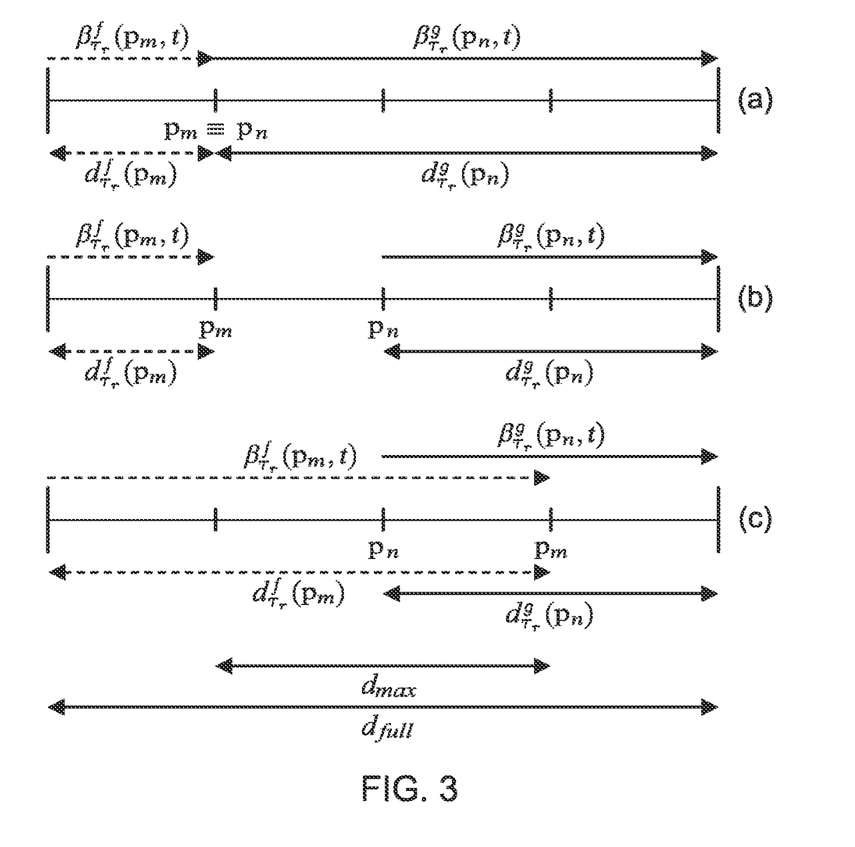
FIG. 3 graphically depicts a cross-correlation structure of incoming and outgoing channel terms useful in understanding the various embodiments.

We further assume that the "incoming" and "outgoing" shadowing terms $\beta_{\tau_r}^f(\mathbf{p}, t)$ and $\beta_{\tau_r}^g(\mathbf{p}, t)$ at positions $\mathbf{p}_m$, and $\mathbf{p}_n$ and between time slots k and l are themselves correlated as $$\mathbb{E}\left[\beta_{\tau_r}^f(p_n, k)\beta_{\tau_r}^g(p_m, l)\right] \triangleq K_{FG}(p_n, p_m)e^{-|k-l|/\gamma}, \quad (14)$$

where the cross-correlation kernel $K_{FG}$ is defined as $$K_{FG}(p_n, p_m) \triangleq \eta^2 e^{(\epsilon \|p_n - p_m\|_2 - d_{max})/\beta}, \quad (15)$$

with $\epsilon = 1$ for $d_{\tau_r}^f(\mathbf{p}_m) + d_{\tau_r}^g(\mathbf{p}_n) \geq d_{full}$ and $\epsilon = -1$ otherwise, and where $d_{full}$ is the length of segment $\tau_r$, and $d_{max}$ is the furthest possible distance between two discrete relay positions of a cluster. This kernel describes the correlation between the incoming and outgoing channels at each cluster, at different locations and at different time slots. Intuitively, correlation should be proportional to the size of the part of the segment which is traversed by both channels, if such a part exists (as shown in FIG. 3(c)). Otherwise, as the distance between the locations where the two channels are respectively experienced increases, their correlation should be decreasing (as shown in FIG. 3(b)). The proposed kernel captures precisely the behavior outlined above, while resulting in a valid cross-covariance structure for $\beta_{\tau_r}^f$ and $\beta_{\tau_r}^g$.

FIG. 3 graphically depicts a cross-correlation structure of incoming and outgoing channel terms useful in understanding the various embodiments. Specifically, FIG. 3 graphically depicts a cross-correlation structure of the incoming and outgoing channel terms $\beta_{\tau_r}^f(\mathbf{p}_n, t)$, $\beta_{\tau_r}^g(\mathbf{p}_m, t)$ when (FIG. 3(a)) $d_{\tau_r}^f(\mathbf{p}_m) + d_{\tau_r}^g(\mathbf{p}_n) = d_{full}$; (FIG. 3(b)) $d_{\tau_r}^f(\mathbf{p}_m) + d_{\tau_r}^g(\mathbf{p}_n) < d_{full}$; and (FIG. 3(c)) $d_{\tau_r}^f(\mathbf{p}_m) + d_{\tau_r}^g(\mathbf{p}_n) > d_{full}$; for cluster r with $\delta = 3$ relay positions, at a common time slot t.

As discussed above, assuming that $q_{\tau_r}^f(\mathbf{p}, t)$ and $q_{\tau_r}^g(\mathbf{p}, t)$ are both white in both space and time, as well as mutually independent, the collection of combined terms $$\begin{bmatrix} z_{\tau_r}^f(p_i, t) \\ z_{\tau_r}^g(p_i, t) \end{bmatrix} \triangleq \begin{bmatrix} \beta_{\tau_r}^f(p_i, t) + \xi_{\tau_r}^f(p_i, t) \\ \beta_{\tau_r}^g(p_i, t) + \xi_{\tau_r}^g(p_i, t) \end{bmatrix}, \quad (16)$$

for $i=1, \ldots, \delta$ and $t=1, \ldots, N_T$, are Gaussian with mean zero and covariance $\Sigma_{\tau_r} \in \mathbb{R}^{2\epsilon N_T \times 2\delta N_T}$ given by $$\Sigma_{\tau_r} \triangleq T \otimes K + \sigma_\xi^2 I_{2\delta N_T}, \quad (17)$$

where $\otimes$ indicates Kronecker product, and the per-slot cross-covariance matrix $K \in \mathbb{R}^{2\delta \times 2\delta}$ is defined as $$K \triangleq \begin{bmatrix} K_{FF} & K_{FG} \\ K_{FG} & K_{GG} \end{bmatrix}, \quad (18)$$

where, overloading notation, $K_{FF}$, $K_{GG}$ and $K_{FG}$ are correlation matrices corresponding to the kernels (13) and (15), respectively, each evaluated on all $\delta^2$ pairs of possible positions across segment $T_r$, according to some common order.

Joint Beamforming and Relay Selection

The various embodiments assume that the network configuration and/or topologies associated with the clusters change at a low rate, and may focus on the time period over which the clusters have been optimally determined and are fixed. During that time, the statistical model of the channel stays the same; however, the channel itself changes. Therefore, assignment of new clusters is necessary only when "coarse-grained" features of the communication system change, such as the locations of the source and destination, the ergodic properties of the communication channel, and other similar statistics. Then, cluster assignment should be performed at a coarser time scale than the change of the individual relay channel realizations. For the duration of a communication task, the aforementioned features typically do not change rapidly, and therefore the cluster does not need to change, justifying the need for a relay selection scheme that operates at a per time-slot basis.

In every time slot, the proposed system jointly performs beaforming and relay selection, by addressing a 2-stage stochastic problem. Before going into the details (and the advantages) of each stage separately, it is noted that although the 2-stage problem refers to the necessary actions needed to be taken during a single time slot, in practice these actions refer to two consecutive time slots, due to the availability of the required CSI. More specifically, during time slot t, both current beamforming weights of the cluster representative are calculated (corresponding, as discussed below, to the 2nd stage problem at time slot t), and the relays from all clusters to be selected at the next time slot are determined (which corresponds to the 1st stage problem at time slot t+1). Both tasks (beamforming and relay selection) are based on current CSI, as well as past CSI of cluster representatives selected up to time slot t.

We assume that 2-hop relaying is used to assist the communication between $\mathbf{p}_S$ and $\mathbf{p}_D$. The whole network is assumed to operate for $N_T$ time slots. In each time slot $t=1, \ldots, N_T$, the source at $\mathbf{p}_S$ transmits the signal $\sqrt{P_S}s(t)$, where s(t) is an information symbol with $E[|s(t)|^2]=1$, and $P_S > 0$ the source transmission power. The signal received at the representative relay of each cluster r, located at $\mathbf{p}_r(t)$ is, $$R_r(t) = \sum_{i=1}^{L_r} \sqrt{P_S} f_{ri}(t)s(t) + n_r(t), \quad (19)$$

where $n_r(t) \sim \mathcal{CN}(0, \sigma^2)$ is the reception noise at cluster r. Working in an AF fashion, each cluster representative modulates its received signal $R_r(t)$ by a complex weight $w_r(t)$ and re-transmits it. Note that a mmWave signal arriving at $\mathbf{p}_D$ directly from the source and without the help of a relay has negligible power, and can be ignored. Therefore, the aggregate signal received at the destination from all relay representatives is $$y_D(t) = \sum_{r=1}^{N_c} \sum_{k=1}^{K_r} w_r(t) g_{rk}(t) R_r(t) + n_D(t) = \qquad (20)$$

$$\underbrace{\sqrt{P_S} \sum_{r=1}^{N_c} w_r(t) \sum_{k=1}^{K_r} \sum_{i=1}^{L_r} g_{rk}(t) f_{ri}(t) s(t)}_{signal} +$$

$$\underbrace{\sum_{r=1}^{N_c} w_r(t) \sum_{k=1}^{K_r} g_{rk}(t) n_r(t) + n_D(t)}_{interference\ +destination\ noise},$$

where $n_D(t) \sim \mathcal{CN}(0, \sigma_D^2)$ is the reception noise at $\mathbf{p}_D$.

Optimal Beamforming for 2-Hop Relaying

The various embodiments may be used to extend known distributed relay beamforming schemes to the significantly more complex setting of urban mmWave relay networks. Here, distributed beamforming is considered for enforcing relay cluster cooperation, such that all individual signal paths forwarded from all relay clusters are combined constructively at the destination. Although the solution of the beamforming stage for the mmWave communication setting studied herein is a straightforward manipulation of the expressions found in the literature pertaining to the free-space communication scenario, the result is interesting because it shows the explicit dependence of the optimal beamforming weights and achievable SINR on the aggregate mmWave channels from all propagation paths.

At every time slot t, the goal is to obtain the respective beamforming weights to be used by each cluster, $w(t) \triangleq [w^*_1(t), \ldots w^*_{N_c}(t)]^T \in \mathbb{C}^{N_c \times 1}$ such that the SINR at $\mathbf{p}_D$ is maximized, subject to a total transmission power budget $P_C > 0$ over all relay clusters. Define the vectors $$f_r(p, t) \triangleq [f_{r1}(p, t), \ldots, f_{rL_r}(p, t)]^T \in \mathbb{C}^{L_r \times 1}, \qquad (21)$$

$$g_r(p, t) \triangleq [g_{r1}(p, t), \ldots, g_{rK_r}(p, t)]^T \in \mathbb{C}^{K_r \times 1}, \qquad (22)$$

$r=1, \ldots, N_c$. Then, after dropping dependence on (t) and ($\mathbf{p}_r(t)$, t) for brevity, the SINR is maximized by solving the following:

$$\begin{aligned}
&\underset{w}{\text{maximize}} && \frac{w^H R w}{w^H Q w + \sigma_D^2}, \text{ where} \qquad (23)\\
&\text{subject to} && w^H D w \leq P_C
\end{aligned}$$

$$R \triangleq P_S h h^H, \quad h \triangleq [1^T g_1 1^T f_1, \ldots, 1^T g_{N_c} 1^T f_{N_c}]^T, \qquad (24)$$

$$D \triangleq P_S \text{diag}(|1^T f_1|^2, \ldots, |1^T f_{N_c}|^2) + \sigma^2 1_{N_c} \text{ and} \qquad (25)$$

$$Q \triangleq \sigma^2 \text{diag}(|1^T g_1|^2, \ldots, |1^T g_{N_c}|^2) \qquad (26)$$

and 1 is the all-ones vector. A crucial technical property of problem (23) is that its optimal can be explicitly expressed as:

$$V(t) = \qquad (27)$$
$$\sum_{r=1}^{N_c} \frac{P_C P_S |1^T f_r|^2 |1^T g_r|^2}{P_S \sigma_D^2 |1^T f_r|^2 + P_C \sigma^2 |1^T g_r|^2 + \sigma^2 \sigma_D^2} = \sum_{r=1}^{N_c} V_l(S_r(p_r(t), t)),$$

where $S_r(\mathbf{p}_r(t), t)$ is a vector of all random variables referring to the shadowing, multi-path, and phase terms of all unique segments traversed for all paths from $\mathbf{p}_S$ to $\mathbf{p}_D$, which also pass through each cluster representative, located at $\mathbf{p}_r(t)$. Specifically, V(t) depends on the relay positions at time slot t. Thus, by optimally positioning the relays, V(t) can be further maximized. This problem is explored in the next subsection.

It is noted that the optimal beamforming vectors enjoys an explicit form similar to that used in the free-space scenario:

$$w_{opt}(t) = \sqrt{P_C} D^{-\frac{1}{2}} \frac{v_{max}}{\|v_{max}\|_2}, \qquad (28)$$

where the alignment vector $v_{max} \in \mathbb{C}^{N_c \times 1}$ is defined as $$v_{max} \triangleq \begin{bmatrix} \frac{P_S 1^T g_1^* 1^T f_1^*}{P_S \sigma_D^2 |1^T f_1|^2 + P_C \sigma^2 |1^T g_1|^2 + \sigma^2 \sigma_D^2} \\ \vdots \\ \frac{P_S 1^T g_{N_c}^* 1^T f_{N_c}^*}{P_S \sigma_D^2 |1^T f_{N_c}|^2 + P_C \sigma^2 |1^T g_{N_c}|^2 + \sigma^2 \sigma_D^2} \end{bmatrix}, \qquad (29)$$

and where $|1^T f_r|^2$ and $|1^T g_r|^2$ are the incoming and outgoing aggregate channels at $\mathbf{p}_r$, respectively. In other words, each cluster representative at $\mathbf{p}_r$ does not need to estimate the individual channels from every propagation path, but rather only the aggregate channel from all propagation paths. In practice, this can be computed by the selected relay via the exchange of pilots.

One may also observe that, while the i-th element of $v_{max}$ can be estimated by the i-th relay only, the vector norm in (28) involves the source and destination channels of all cluster representatives who will beamform at the current time. Therefore, that scalar will have to be computed centrally and then distributed to all clusters. This may be implemented using module 220-CTPCM of FIG. 2 and a high-speed, optical fiber based backhaul network that connects all relay clusters, as well as all relays within a cluster, with each other. For the source and destination which are, e.g. moving vehicles, no wired connection to the backhaul exists. The beamforming stage requires $\mathcal{O}(N_c)$ operations.

It is noted that during the beamforming step, phase synchronization is required to take care of local oscillator phase offsets. Thus, in various embodiments, phase synchronization between relay clusters is performed via the backhaul network (e.g., via controller 200) or via a master relay cluster (e.g., cluster C3 of the network 100 of FIG. 1) to which all other relay clusters synchronize, or by some other means.

Optimal Relay Selection for 2-Hop Relaying

At every time slot, each cluster must decide which is the appropriate relay to be used for beamforming. Typically, this would first require estimating the respective channel of every relay in the cluster, and then deciding upon the strongest one. Clearly, this decision making procedure not only wastes power and bandwidth during CSI estimation, but also induces extra delay before optimized communication can take place within each time slot. This delay is significant, especially if the number of relays per cluster is large. In this subsection, a new scheme for adaptive relay selection which completely avoids this overhead is proposed, thus resulting in much better time slot utilization.

More specifically, the proposed relay selection scheme is based on transferring the implementation of the relay selection procedure from the current time slot, to the previous time slot. In other words, relay selection would be implemented predictively by efficiently exploiting the statistical model of the mmWave channel, before the respective time slot starts. As a result, at each time slot, optimal beamforming is implemented by utilizing the cluster representatives which were optimally selected during the previous slot. This immediately results in the complete elimination of the "waiting delay" discussed above; indeed, if predictive relay selection is sufficiently accurate, then the cluster representatives at each time slot can be predetermined, before the slot starts. This means that relay selection and beamforming can be completely decoupled within each time slot, and thus can be parallelized; indeed, at each time slot, optimal beamforming can be implemented simultaneously with optimal predictive relay selection affecting the next time slot. In addition to eliminating the "waiting delay", the proposed scheme also enables a substantial reduction of the CSI estimation overhead required for relay selection, as well as significant power savings.

We now describe the proposed relay selection scheme in detail. As described above, at time slot t, the interest is in deciding on the best relay representatives from all clusters to participate in beamforming at time slot t+1, such that the networkwide SINR, V(t+1), is maximized. However, at the current time slot t, future CSI needed for evaluating V(t+1) is not yet available. Nevertheless, a reasonable causal criterion for optimal relay selection is to maximize a projection of V(t+1) on information available at time slot t. Following this path, it is proposed to maximize an WSE predictor of V(t+1) relative to the collection $\mathcal{C}_r(t)$ of all magnitude CSI, or RSS, from the segments of all propagation paths associated with all previously selected representatives of cluster r, as well as the positions of the representatives themselves, up until and including t. Then, due to the additive structure of (27), each cluster r can independently solve $$\underset{p}{\text{maximize}} \quad \mathbb{E}[V_I S_r(p, t+1)) \mid C_r(t)] \qquad (30)$$

$$\text{subject to} \quad p \in C_r(t)$$

where $\mathcal{C}_r(\cdot)$ constitutes the set of candidate relays within the cluster which can potentially be selected. This set can either be unconstrained, including any relay within the cluster, or constrained to only a subset of relays within the cluster. As can be seen by (30), the approach exploits spatial and temporal dependencies of channel shadowing, an otherwise negative effect imposed by the communication medium, in order to actually benefit network QoS by predicting future, one-step-ahead SINR.

Next, define the sets $\mathcal{S}_r^f = \cup_{i=1}^{L_r} \mathcal{S}_{ri}^f$ and $\mathcal{S}_r^g = \cup_{i=1}^{K_r} \mathcal{S}_{ri}^g$. Then, at every feasible location $\mathbf{p} \in \mathcal{C}_r(t)$, the objective of (30) may be expressed as $$\mathbb{E}[V_I S_r(p, t+1)) \mid C_r(t)] = \int V_I(p, s) p_{S_r(p,t+1)|C_r(t)}(s) ds, \qquad (31)$$

where, dropping dependence on $(\mathbf{p}, t+1)$, $V_I$ may be reexpressed in a more integration-friendly form as $$V_I(\cdot, \mathcal{Z}_r^f, \varphi_r^f, \mathcal{Z}_r^g, \varphi_r^g) = \frac{P_C P_S F(\mathcal{Z}_r^f, \varphi_r^f,)G(\mathcal{Z}_r^g, \varphi_r^g)}{P_S \sigma_D^2 F(\mathcal{Z}_r^f, \varphi_r^f,) + P_C \sigma^2 G(\mathcal{Z}_r^g, \varphi_r^g) + \sigma^2 \sigma_D^2}, \qquad (32)$$

with F being a function of the sets $\mathcal{Z}_r^f = \{z_{\tau_r}^f, \{z_\tau\}_{\tau \in \mathcal{S}_r^f}\}$, and $\varphi_r^f = \{\phi_{\tau_r}^f, \{\phi_\tau\}_{\tau \in \mathcal{S}_r^f}\}$, corresponding to the combined shadowing plus multi-path, and phase terms of the unique segments traversed in all paths between the source and cluster r, and respectively for G, $\mathcal{Z}_r^g$ and $\varphi_r^g$.

By a slightly tedious but straightforward procedure, it may be shown that the joint conditional density of all random variables contained in vector $S_r(\mathbf{p}, t+1)$ relative to $\mathcal{C}_r(t)$ can be expressed as (by overloading notation)

$$p_{S_r(p,t+1)|C_r(t)}(\mathcal{Z}_r^f, \varphi_r^f, \mathcal{Z}_r^g, \varphi_r^g) = \qquad (33)$$

$$\mathcal{N}\left([z_{\tau_r}^f z_{\tau_r}^g]; \mu_{\tau_r}^{t+1|t}(p), \sum_{\tau_r}^{t+1|t}(p)\right) \times \mathcal{U}(\phi_{\tau_r}^f; 0, 1)$$

$$\mathcal{U}(\phi_{\tau_r}^g; 0, 1) \times \prod_{\tau \in S_r^f \cup S_r^g} \mathcal{N}(z_\tau; \mu_\tau^{t+1|t}, (\sigma_\tau^{t+1|t})^2)\mathcal{U}(\phi_\tau; 0, 1),$$

where $\mathcal{U}(\bullet; 0,1)$ denotes the uniform density on $[0,1]$, and where $\mu_{\tau_r}^{t+1|t}(\mathbf{p})$, $\Sigma_{\tau_r}^{t+1|t}(\mathbf{p})$, $\mu_\tau^{t+1|t}$ and $(\sigma_\tau^{t+1|t})^2$ constitute the corresponding posterior statistics, each relative to local CSI at the corresponding segment, respectively. This readily follows by mutual independence of the corresponding CSI processes across segments.

Note that, although phase information at time slot t+1 is present in (32), the objective (31) is independent of phase information at past time slots. This is because of the standard assumption that, for each segment, the phase component of the channel is white in time and space, and mutually independent of the respective phase component of all other segments. Indeed, one may readily observe that, in (33), all distributions associated with channel phases are uniform in $[0,1]$, which is precisely the prior distribution of all phase components, for all segments taking part in the communication.

From the discussion above, it follows that tractably evaluating (31) is a challenging task. Of course, as expected, the first step towards evaluation of (31) is the efficient determination of the aforementioned predictors. This is the subject of the next two subsections.

Channel Prediction for Cluster-Free Segments

The shadowing component of the channel for a cluster-free segment $\tau$, $\beta_\tau$, is a Gaussian process evolving in time, which may also be represented as a stable autoregression of order 1. Indeed, it may be easily shown that, at every segment $\tau \in \cup_{r=1}^{N_c}(\mathcal{S}_r^f \cup \mathcal{S}_r^g)$, $\beta_\tau$ can be represented via the stochastic difference equation:

$$\beta_\tau(t) = \kappa\beta_\tau(t-1) + w_\tau(t), \, t=1, \ldots, N_T, \tag{34}$$

where $\kappa \triangleq e^{-1/\gamma}$, $\beta_\tau(0) \sim \mathcal{N}(0, \eta^2)$, with the latter being independent of $w_\tau(t) \overset{i.i.d.}{\sim} \mathcal{N}(0, (1-\kappa^2)\eta^2)$, $t=1, \ldots, N_T$.

At the same time, across time slots, the shadowing process $\beta_\tau(t)$ cannot be measured directly. Instead, it may be considered as corrupted by unpredictable noise, due to the presence of the multi-path component $\xi_\tau(t)$; indeed, at each time slot t and segment $\tau$, the term $z_\tau(t)=\beta_\tau(t)+\xi_\tau(t)$ is observed.

Now, for every segment $\tau \in \cup_{r=1}^{N_c}(\mathcal{S}_r^f \cup \mathcal{S}_r^g)$, define the vector $$m_\tau^{1:t} \triangleq [z_\tau(1), \ldots, z_\tau(t)]^T \in \mathbb{R}^{t \times 1}, \tag{35}$$

which contains all observable zero-mean CSI magnitudes associated with that segment, up to time t. Then, exploiting the autoregressive representation of (34), it follows that the posterior distribution of $z_\tau(t+1)$ relative to $m_\tau^{1:t}$ is Gaussian with conditional mean and variance given by $$\mu_\tau^{t+1|t} = \kappa\beta_\tau^{t|t} \text{ and} \tag{36}$$

$$(\sigma_\tau^{t+1|t})^2 = \kappa^2\rho_{\beta_\tau}^{t|t} + (1-\kappa^2)\eta^2 + \sigma_\xi^2, \tag{37}$$

respectively, where, by definition, $$\beta_\tau^{t|t} \triangleq \mathbb{E}[\beta_\tau(t) \mid m_\tau^{1:t}] \text{ and} \tag{38}$$

$$\rho_{\beta_\tau}^{t|t} \triangleq \mathbb{E}[(\beta_\tau(t) - \mathbb{E}[\beta_\tau(t) \mid m_\tau^{1:t}])^2 \mid m_\tau^{1:t}] \tag{39}$$

are the conditional mean and variance of $\beta_\tau(t)$ relative to $m_\tau^{1:t}$, respectively. Therefore, determination of $\mu_\tau^{t+1|t}$ and $(\sigma_\tau^{t+1|t})^2$ is equivalent to that of $\beta_\tau^{t|t}$ and $\rho_{\beta_\tau}^{t|t}$, respectively, for all $t=1, \ldots, N_T$. Again due to the autoregressive structure of (34), the latter pair of conditional estimates may be evaluated recursively via a Kalman filter, achieving constant computational complexity per time slot. Specifically, for every $t=1, \ldots, N_T$, both $\beta_\tau^{t|t}$ and $\rho_{\beta_\tau}^{t|t}$ may be evaluated recursively via the updates $$\beta_\tau^{t|t} = \kappa\beta_\tau^{t-1|t-1} + K^t(z_\tau(t) - \kappa\beta_\tau^{t-1|t-1}), \tag{40}$$

$$\rho_{\beta_\tau}^{t|t} = K^t\sigma_\xi^2 \text{ and} \tag{41}$$

$$K^t = \frac{\kappa^2\rho_{\beta_\tau}^{t-1|t-1} + (1-\kappa^2)\eta^2}{\kappa^2\rho_{\beta_\tau}^{t-1|t-1} + (1-\kappa^2)\eta^2 + \sigma_\xi^2}, \tag{42}$$

initialized by setting $\beta_\tau^{0|0}=0$ and $\rho_{\beta_\tau}^{0|0}=\eta^2$, stemming from the statistics of the initial condition $\beta_\tau(0)$. By direct comparison of (36) and (37) to the Kalman filter equations (40), (41) and (42), it is easy to derive an algorithm for the direct recursive evaluation of $\mu_\tau^{t+1|t}$ and $(\sigma_\tau^{t+1|t})^2$, comprised, for $t=1, \ldots, N_T$, by the dynamic equations $$\mu_\tau^{t+1|t} = \kappa(1-K^t)\mu_\tau^{t|t-1} + \kappa K^t z_\tau(t), \tag{43}$$

$$(\sigma_\tau^{t+1|t})^2 = (1+\kappa^2 K^t)\sigma_\xi^2 + (1-\kappa^2)\eta^2 \text{ and} \tag{44}$$

$$K^t = \frac{(\sigma_\tau^{t|t-1})^2 - \sigma_\xi^2}{(\sigma_\tau^{t|t-1})^2}, \tag{45}$$

initialized by setting $\mu_\tau^{1|0}=0$ and $(\sigma_\tau^{1|0})^2=\eta^2+\sigma_\xi^2$.

For each cluster-free segment $\tau \in \cup_{r=1}^{N_c}(\mathcal{S}_r^f \cup \mathcal{S}_r^g)$, the corresponding Kalman filter may be implemented either centrally within each cluster, or in a completely distributed fashion, where each cluster-free segment is responsible for tracking its own channel, and then for distributing its estimate to the associated cluster, responsible for the actual relay selection. Due to its recursive nature, each Kalman filter required an order of $\mathcal{O}(1)$ operations for each cluster-free segment.

Channel Prediction for Segments Containing Clusters

Next, consider the segment $\tau_r$, containing cluster r. Then, if define $z_{\tau_r}^{f,g} \triangleq [z_{\tau_r}^f z_{\tau_r}^g]^T$ and store all CSI measurements of every previously selected representative of cluster r in $$m_{\tau_r}^{1:t} = [z_{\tau_r}^{f,g}(p_r(1), 1), \ldots, z_{\tau_r}^{f,g}(p_r(t), t)]^T \in \mathbb{R}^{2t \times 1}, \tag{46}$$

then, for each location $\mathbf{p} \in \mathcal{C}_r(t)$, the mean vector and covariance matrix of the Gaussian random vector $z_{\tau_r}^{f,g}(\mathbf{p}, t+1)$ conditioned on $m_{\tau_r}^{1:t}$ are $$\mu_{\tau_r}^{t+1|t}(p) = (\overline{\sigma}_{\tau_r}^{1:t}(p))^T (\sum_{\tau_r}^{1:t})^{-1} m_{\tau_r}^{1:t} \in \mathbb{R}^{2 \times 1} \tag{47}$$

$$\sum_{\tau_r}^{t+1|t}(p) = \overline{K} - (\overline{\sigma}_{\tau_r}^{1:t}(p))^T (\sum_{\tau_r}^{1:t})^{-1} \overline{\sigma}_{\tau_r}^{1:t}(p) \in \mathbb{R}^{2 \times 2}, \tag{48}$$

respectively, where $$\overline{K} = \begin{bmatrix} \eta^2 + \sigma_\xi^2 & \eta^2 e^{-d_{max}/\beta} \\ \eta^2 e^{-d_{max}/\beta} & \eta^2 + \sigma_\xi^2 \end{bmatrix}, \tag{49}$$

and $\Sigma_{\tau_r}^{1:t} \in \mathbb{R}^{2t \times 2t}$, $\overline{\sigma}_{\tau_r}^{1:t} \in \mathbb{R}^{2t \times 2}$ are sampled for every time slot until t from $\Sigma_{\tau_r} \in \mathbb{R}^{2\delta N_T \times 2\delta N_T}$ at the positions that correspond to the distance between the candidate location $\mathbf{p}$ and the respective locations where the incoming and outgoing channels of segment $\tau_r$ have been experienced so far. It is noted that unlike before, (47) and (48) cannot be estimated using a Kalman filter, but rather, using full-blown Gaussian process regression. The dominant operation of (47) and (48) is the inversion of the covariance matrix $\Sigma_{\tau_r}^{1:t}$. The computational complexity of this inversion is of the order of $\mathcal{O}(t^3)$ operations, and grows with time due to conditioning on past CSI. Nevertheless, the complexity can be reduced to $\mathcal{O}(t^2)$, via a classical application of the matrix inversion lemma.

Reduced-Complexity Sample Average Approximation

Having determined the necessary posterior statistics involved in (33), the next step is evaluate the objective of (30) or, equivalently, the multi-dimensional integral (31). However, since a closed-form representation of (31) is substantially impossible to derive, a near-optimal approach is used. In particular, the SAA method is relied upon, and replace (30) by an easily computable surrogate, constructed via unconditional Monte Carlo sampling.

To define the proposed surrogate to (30), fix $\mathbf{p} \in \mathcal{C}_r(t)$ and $t=1, \ldots, N_T$, and consider the change of variables (again, overloading notation)

$$v_\tau = (\sigma_\tau^{t+1|t})^{-1}(z_\tau - \mu_\tau^{t+1|t}), \; \forall \, \tau \in \mathcal{S}_r^f \cup \mathcal{S}_r^g \text{ and} \tag{50}$$

$$v_{\tau_r}^{f,g} = \left(\sum_{\tau_r}^{r+1|t}(p)\right)^{-1/2}(z_{\tau_r}^{f,g} - \mu_{\tau_r}^{t+1|t}(p)), \tag{51}$$

to the integral of (31). Additionally, also define the collections $\mathcal{V}_r^f \triangleq \{v_{\tau_r}^{f,g}, \{\mathcal{V}_\tau\}_{\tau \in \mathcal{S}_{r,f}}\}$ and $\mathcal{V}_r^g \triangleq \{v_{\tau_r}^{f,g}, \{\mathcal{V}_\tau\}_{\tau \in \mathcal{S}_{r,g}}\}$. Then, (31) may be equivalently represented as $$\mathbb{E}[V_I(S_r(p, t+1)) \mid C_r(t)] = \int \overline{V}_I^{t+1|t}(p, s) p_{\overline{S}}(s) ds, \tag{52}$$

where $$\overline{V}_I^{t+1|t}(p, \mathcal{V}_r^f, \phi_r^f, \mathcal{V}_r^g, \phi_r^g) = \tag{53}$$

$$\frac{P_C P_S F^{t+1|t}(p, \mathcal{V}_r^f, \varphi_r^f) G^{t+1|t}(p, \mathcal{V}_r^g, \varphi_r^g)}{P_S \sigma_D^2 F^{t+1|t}(p, \mathcal{V}_r^f, \varphi_r^f) + P_C \sigma^2 G^{t+1|t}(p, \mathcal{V}_r^g, \varphi_r^g) + \sigma^2 \sigma_D^2}$$

with the functions $F^{t+1|t}$ and $G^{t+1|t}$ being defined as follows (where if x is a vector, then $x|_i$ denotes its i-th entry):

$$F^{t+1|t}(p, \mathcal{V}_r^f, \varphi_r^f) \triangleq \tag{54}$$

$$F\left(p, \left(\sum_{\tau_r}^{t+1|t}(p)\right)^{1/2} v_{\tau_r}^{f,g} + \mu_{\tau_r}^{t+1|t}(p)\right|_1, \{v_\tau \sigma_\tau^{t+1|t} + \mu_\tau^{t+1|t}\}_{\tau \in S_r^f}, \varphi_r^f\right)$$

and $$G^{t+1|t}(p, \mathcal{V}_r^g, \varphi_r^g) \triangleq G\left(p, \left(\sum_{\tau_r}^{t+1|t}(p)\right)^{1/2} v_{\tau_r}^{f,g} + \mu_{\tau_r}^{t+1|t}(p)\right|_2, \tag{55}$$

$$\{v_\tau \sigma_\tau^{t+1|t} + \mu_\tau^{t+1|t}\}_{\tau \in S_r^g}, \varphi_r^g\Big),$$

and where $\overline{S}$ follows the distribution induced by the density $$p_{\overline{S}}(\mathcal{V}_r^f, \varphi_r^f, \mathcal{V}_r^g, \varphi_r^g) = \mathcal{N}(v_{\tau_r}^{f,g}; 0, I_2) \; \mathcal{U}(\phi_{\tau_r}^f; 0, 1) \tag{56}$$

$$\mathcal{U}(\phi_{\tau_r}^g; 0, 1) \times \prod_{\tau \in S_r^f \cup S_r^g} \mathcal{N}(z_\tau; 0, 1) \; \mathcal{U}(\phi_\tau; 0, 1).$$

The representation (52) exhibits an important and rather practically appealing property: The density $p_{\overline{S}}$ is completely independent of both $\mathbf{p}$ and $\mathcal{C}_r(t)$, and all such dependence has been transferred to $\nabla_I^{t+1|t}$.

Advantageously, sampling from $p_{\overline{S}}$ is greatly facilitated for the SAA-based scheme, such as described with respect to the Joint Beamforming and relay Selection Scheme of FIG. 4, which is also presented below:

```
for t = 1: N_T do
    Beamforming (2nd stage of time slot t)
    Inputs: Channel aggregates |1^T f_r|^2 and |1^T g_r|^2
    Compute optimal w_opt(t) from (28)
    Relay selection (1st stage of time slot t + 1)
    for every cluster r do
        Inputs: a) RSS {z_τ(t)}_{τ∈S_r^f∪S_r^g} until t
                b) RSS z_{τ_r}^f(t) and z_{τ_r}^g(t) until t
        Generate S̄ from (56)
        for each p ∈ C_r(t) do
            Compute V̂_I(p, t + 1) from (57)
        end for
        Choose p_r(t + 1) ∈ argmax_{p∈C_r(t)} V̂_I(p, t + 1)
    end for
end for
```

For each relay cluster r and at every time slot t, the SAA method works by randomly generating a total of $N_S$ scenarios, drawn from the distribution induced by $p_{\overline{S}}$. Clearly, due to the special form of $p_{\overline{S}}$, this is straightforward to implement. Then, each scenario $\overline{S}^{(i)}$, $i=1, \ldots, N_S$ is used to evaluate $\nabla_I^{t+1|t}$, at every possible relay position within the set of feasible locations, $\mathcal{C}_r(t)$. Finally, leveraging (52), the SAA of (31) is formulated by replacing the expectation in its objective with an empirical mean as $$\underset{p}{\text{maximize}} \; \hat{V}_I(p, t+1) \triangleq \frac{1}{N_S} \sum_{i=1}^{N_S} \overline{V}_I^{t+1|t}\left(p, \overline{S}^{(i)}\right), \tag{57}$$

$$\text{subject to} \quad p \in C_r(t)$$

The above may be solved by enumeration. The optimal solution of (57) corresponds to the selected relay at t+1.

In some embodiments, the same set of scenarios may be used by all relays, in all clusters, and even at all time slots. This, of course, keeps the sampling requirements at a bare minimum, networkwide.

In regard to the per cluster computational complexity of the proposed SAA-based scheme, at each time slot t, the conditional statistics of the term $z_{\tau_r}^{f,g}(\bullet, t+1)$ relative to $m_{\tau_r}^{1:t}$ need to be evaluated, for all $r=1, \ldots, N_c$. As explained above, for a single relay of a specific cluster, this requires an order of $\mathcal{O}(t^2)$ operations at time slot t, but since this needs to be done for all relays of the cluster, then end up with an order of $\mathcal{O}(\delta t^2)$ operations. Additionally, for each of the $|S_r^f \cup S_r^g|$ segments (not containing a cluster) associated with cluster r, $\mathcal{O}(1)$ complexity is required due to the recursive form of the Kalman filter. Therefore, the total computational complexity of the SAA-scheme for cluster r, in time slot t, is at most of the order of $O(\delta t^2 + |S_r^f \cup S_r^g|)$; in fact, in most cases, this complexity is often much smaller, since each of the segments contained in $S_r^f \cup S_r^g$ may also be associated with clusters other than r, as well.

2-Stage Joint Beamforming/Relay Selection

Figure 4:
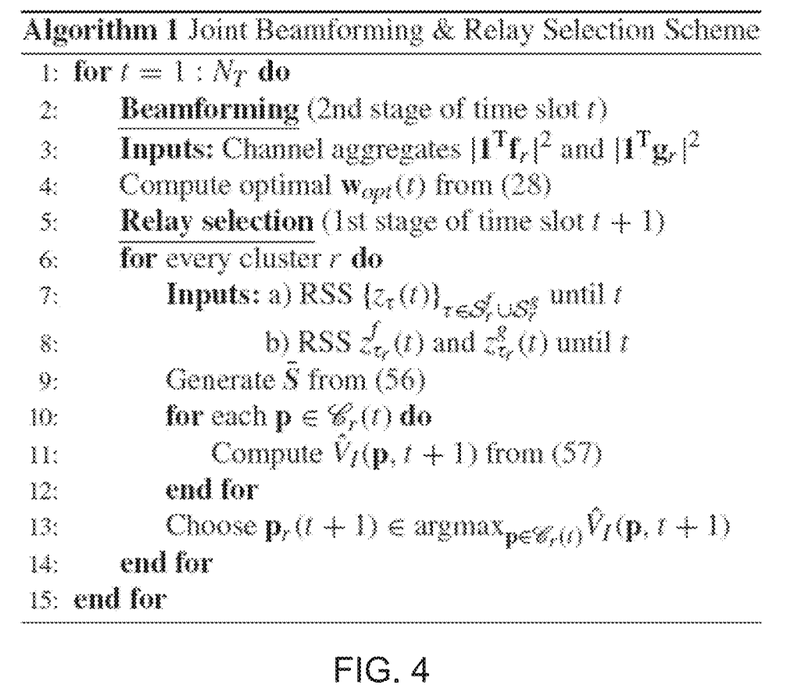
FIG. 4 depicts a pseudocode representation of a 2-stage joint beamforming and relay selection method according to an embodiment.

FIG. 4 depicts a pseudocode representation of a 2-stage joint beamforming and relay selection method or scheme according to an embodiment. Specifically, at time t, beamforming towards the destination is performed, which corresponds to the 2nd stage problem of time slot t. In this stage, the RSS and phases of the channel aggregates at every cluster representative need to be centrally collected, in order to compute the optimal beamforming weights. Within the same time slot t, and in parallel to beamforming, the 1st stage problem of time slot t+1 is solved, i.e., every cluster individually selects the relay to be used for beamforming in the subsequent time slot. In this stage, in addition to the CSI of the cluster representative at $\mathbf{p}_r$, the relay selection process also requires the CSI of the unique segments that comprise the propagation paths to that cluster. This information can be easily acquired via low cost devices, e.g., channel sounders, placed on every street segment, and then sent through the backhaul network to the respective cluster.

In various embodiments, it is deemed to be sufficient to condition on a window of past time slots rather than to the entire observed RSS history. Such an approximation works well even for a relatively small window size, due to the exponentially decaying structure of the temporal correlation component of the channel model. Moreover, depending on the mmWave channel coherence time, some embodiments are adapted to follow a two-timescale design, where the beamforming weights are computed in every time slot but relay selection would be executed over a longer time interval (e.g., 2, 3, 4 or more time-slots). That is, in some embodiments the steps of beamforming and relay selection are performed during a first time slot and each subsequent time slot. Whereas in other embodiments, the step of beamforming is performed during each time slot, but the step of relay selection is performed during a first time slot and then every Nth subsequent time slot, where N is an integer greater than 0 (e.g., 1, 2, 3, 4, 10, 50 etc.).

Operational Phases of the Time Slot

This section provides a discussion of relay selection and beamforming operations. In every time slot of the ideal scheme, relay selection is always implemented before optimal beamforming; this is simply due to the fact that acquisition of the current RSS has to inevitably be performed in the same time slot as beamforming. On the other hand, in the proposed scheme, relay selection at the current time slot is implemented predictively during the previous time slot, by efficiently exploiting past RSS observations. As a result, the overhead caused by the relay selection process can be effectively bypassed, and optimal beamforming at the current time slot may be implemented completely in parallel with the predictive relay selection affecting the next time slot.

Next, looking at the CSI estimation requirement of each selection scheme into more detail. In the ideal scheme, the incoming and outgoing channels of every relay for all clusters are initially estimated. This requires estimating $N_{ideal}=2\delta N_c$ distinct channels. Channel estimation is initiated by a pilot symbol broadcaster from the source, with every relay of all clusters measuring their RSS. A similar procedure is done for estimating the respective channels towards the destination. On the contrary, the proposed scheme requires estimating the CSI of only the cluster representative, as well as the CSI of every associated segment $\tau \in S_r^f \cup S_r^g$, for every cluster $r=1, \ldots, N_c$.

Therefore, $N_{proposed}=2N_c+|\cup_{r=1}^{N_c} S_r^f \cup S_r^g|$ channels have to be estimated, where $|\cdot|$ denotes the cardinality of a set.

In other words, when $\delta > 1+|\cup_{r=1}^{N_c} S_r^f \cup S_r^g|/2N_c$, the proposed scheme will always require less number of channel estimations.

Figure 5:
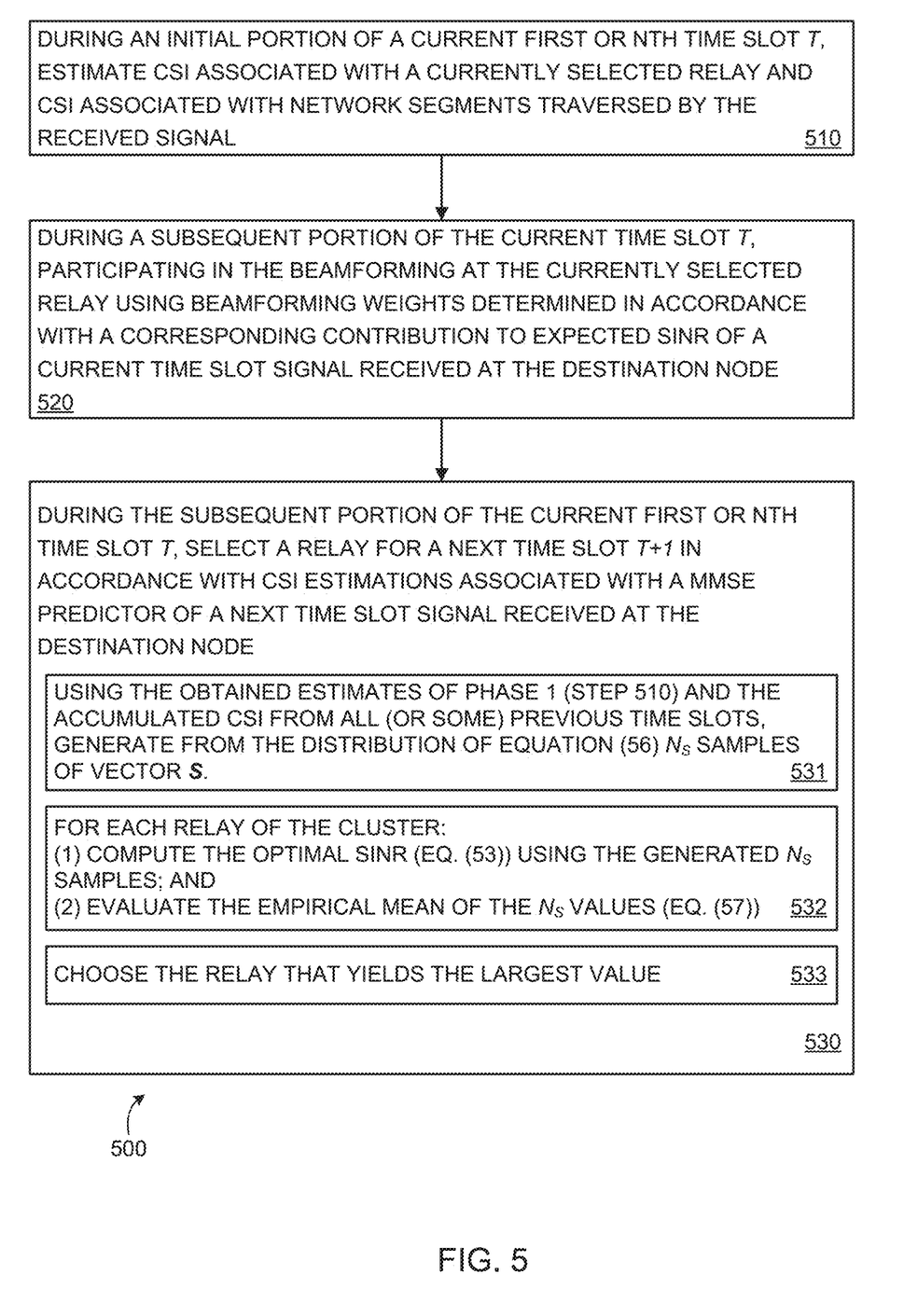
FIG. 5 depicts a flow diagram of a method according to an embodiment and suitable for use as an execution method at a cluster of relays, such as described in more detail with respect to the simplified deployment example of FIG. 1.

FIG. 5 depicts a flow diagram of a method according to an embodiment and suitable for use as an execution method at each of a plurality of relay cluster C, such as described above with respect to the simplified deployment example of FIG. 1. Specifically, the method 500 of FIG. 5 tracks the method 400 discussed above with respect to FIG. 4, as well as the various teachings disclosed herein. In various embodiments, it is contemplated that the method 500 of FIG. 5 is executed at each cluster operative to forward a signal such as from the source node S to the destination node D, as posited above. That is, the method 500 provides for relay selection at each of a plurality of cooperating nodes within a millimeter wave network, wherein each node is configured to forward a received signal toward a destination node, wherein at least some of the nodes comprise a cluster of relays configured for beamforming in a link between the respective node and the destination node. The method may be implemented at the controller 200 as described above with respect to FIG. 2.

At step 510, during an initial portion of a current first or Nth time slot t (which may occur during each time slot t, after the occurrence of some number of time slots t, or periodically) the method estimates Channel State Information (CSI) associated with a currently selected relay and CSI associated with network segments traversed by the received signal. Each cluster may receive this information from respective clusters, such as initially provided by one or proximately located sounders.

At step 520 (which may occur after or contemporaneously with step 530), during the current time slot t, the method performs/causes beamforming at the currently selected relay using beamforming weights determined in accordance with a corresponding contribution to Signal-to-Interference+ Noise Ratio (SINR), given by V(t), at the destination node.

At step 530 (which may occur before, after, or contemporaneously with step 520), during the current time slot t, the method selects a relay for a next time slot t+1 in accordance with CSI estimations associated with a maximized minimum mean square error (MNISE) predictor of a next time slot V(t+1) at the destination node. In particular, the method 500 selects the most suitable relay to participate in beamforming of the subsequent time slot, wherein the selected relay may comprise the relay that maximizes the prediction of the average SINR at the destination.

Specifically, step 530 may be implemented as follows:

At step 531, using the obtained estimates and/or the accumulated CSI from some or all previous time slots (step 510), generate from the distribution of equation (56) $N_S$ samples of vector $\bar{S}$.

At step 532, for each relay of the cluster, (1) compute the optimal SINR (equation (53)) using the generated $N_S$ samples; and then (2) evaluate the empirical mean of the $N_S$ values (equation (57)).

At step 533, choose the relay that yields the largest value from the evaluation at step 532.

It is noted that steps 520 and 530 may be performed in parallel. Generally speaking, for an initial portion of at least some of the time slots t, the method 500 comprises estimating N channels. If N<2R, then the various embodiments require estimating fewer channels than the respective initial time slot portions of conventional relaying. It is noted that the decision-making method of a subsequent portion of the time slots t may be performed using local or centralized computational resources, such as a local (e.g. proximate one or several clusters or communications nodes) or remote (e.g., remote to the various clusters or communications nodes, such as at a network operations center, network management system or the like) controller configured in relevant part as discussed above with respect to FIG. 2, Compared to the ideal, the proposed relay selection scheme is particularly advantageous in dense network topologies, where, to account for high channel variability, each cluster needs to include a large number of relays, and the number of relays per cluster is relatively larger than the number of segments taking part in the communication. Actually, a dense network is required even if the shadowing variance is low, since this implies weaker channel correlation, due to the now dominant multi-path fading. It is then clear that the proposed scheme requires significantly fewer channels to be estimated than the ideal scheme, which in turn leads to reduced channel estimation overhead.

It is noted that the various embodiments incur a computational burden associated with the relay selection process, due to the execution of the method 400 of FIG. 4 or the method 500 of FIG. 5. However, the parallelization of relay selection and optimal beamforming in each time slot not only compensates for that burden, but also naturally leads to more consistent ergodic performance, as long as the accuracy of predictive relay selection is adequate.

It is noted that the various embodiments described above contemplate the use of a specific mmWave communication model. However, the various embodiments are applicable to any other mmWave communication models where the respective channel model conforms to a segmented structure as defined above. Further, it is noted that various embodiments may be implemented in a model-free or model-agnostic manner, such as by using reinforcement learning and similar methodologies. In these embodiments, the above-described methods are modified to correspond to the channel model used, the specific reinforcement learning methodology used and so on (e.g., steps in the relay prediction phase are modified to correspond to a specific reinforcement learning algorithm).

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for relay selection at each of a plurality of cooperating nodes within a millimeter wave network configured to spatially diversify a transmitted signal through all sets of consecutive, nonrepeating network segments including non-line-of-sight (NLoS) segments from a source node to a destination node, each cooperating node configured to forward a respective received signal toward the destination node via respective network segments including the NLoS segments, each cooperating node comprising a respective cluster of relays configured for beamforming in a link between the each cooperating node and the destination node, the method comprising:

at a first cooperating node of the plurality of cooperating nodes during a current time slot t, estimating first Channel State Information (CSI) associated with a currently selected relay and estimating second CSI associated with the network segments including the NLoS segments traversed by the received signal, the currently selected relay comprising a relay within the cooperating node cluster of relays;

at the first cooperating node during the current time slot t, performing beamforming by the currently selected relay using beamforming weights determined in accordance with a corresponding contribution to Signal-to-Interference+Noise Ratio (SINR) of a current time slot signal V(t) received at the destination node; and at the first cooperating node during the current time slot t, selecting, from the cluster of relays of the first cooperating node, a relay for a next time slot t+1 in accordance with the second estimated CSI associated with a maximized minimum mean square error (MMSE) predictor of a SINR of a next time slot signal V(t+1) received at the destination node;

wherein each of the estimating first CSI and the estimating second CSI is made using a channel model including a correlation kernel describing a correlation within the millimeter wave network between incoming and outgoing channels at each cluster, at different locations, and during different time slots.

2. The method of claim 1, wherein said estimating first CSI associated with a currently selected relay is performed during each time slot t of a sequence of time slots including the current time slot and the next time slot.

3. The method of claim 1, wherein said estimating first CSI associated with a currently selected relay is performed during a first time slot t of a sequence of time slots including the current time slot and the next time slot and every Nth timeslot t thereafter.

4. The method of claim 1, wherein the cluster of relays is associated with at least one channel sounding device configured to estimate channel characteristics proximate the cluster of relays.

5. The method of claim 1, wherein each cooperating node performs the beamforming and the selecting a relay during each time slot t of a sequence of time slots including the current time slot and the next time slot.

6. The method of claim 1, wherein each cooperating node participating in beamforming performs the beamforming during each time slot t of a sequence of time slots including the current time slot and the next time slot, and wherein each cooperating node performs the selecting a relay every Nth time slot, wherein N is an integer greater than 0.

7. The method of claim 1, wherein the estimating first CSI is performed during a first stage of the current time slot t, and the beamforming and the selecting a next relay for the next time slot are performed during a second stage of the current time slot t.

8. The method of claim 1, wherein the received signal to be forwarded is associated with the source node and the destination node, and the network segments traversed by the signal comprise those network segments proximate a signal path between the source node and an intermediate cooperating node.

9. The method of claim 1, wherein the received signal to be forwarded is associated with the source node and the destination node, and the network segments traversed by the signal comprise those network segments located on street paths between the source node and an intermediate cooperating node.

10. The method of claim 1, wherein the received signal to be forwarded is associated with the source node and the destination node, and the network segments traversed by the signal comprise those network segments located on street paths between the source node and the destination node.

11. The method of claim 1, wherein street paths traversed by the signal are determined using street map data associated with the millimeter wave network.

12. The method of claim 1, wherein the millimeter wave network is associated with a segmented structure channel model.

13. The method of claim 1, wherein the first cooperating node comprises one of a plurality of nodes distributed throughout a network coverage area including nodes proximate respective channel sounders, each channel sounder configured to estimate channel characteristics and provide thereby CSI.

14. The method of claim 1, wherein the first cooperating node comprises one of a plurality of nodes located at respective streets in an urban area.

15. A communications node for use in a millimeter wave cooperative network configured to spatially diversify a transmitted signal through all sets of consecutive, nonrepeating network segments including non-line-of-sight (NLoS) segments from a source node to a destination node, the communications node configured to forward a respective received signal toward the destination node via respective network segments including the NLoS segments, the communications node comprising:

a group of proximately located relays forming thereby a cluster of relays, wherein during a current time slot t, a controller performs steps of:

estimating first Channel State Information (CSI) associated with a currently selected relay and estimating second CSI associated with the network segments including NLoS segments traversed by the received signal;

performing beamforming at the currently selected relay using beamforming weights determined in accordance with a corresponding contribution to Signal-to-Intederence+Noise Ratio (SINR) of a current time slot signal V(t) received at the destination node; and selecting a relay for a next time slot t+1 in accordance with the second estimated CSI associated with a maximized minimum mean square error (MMSE) predictor of a SINR of a next time slot signal V(t+1) received at the destination node;

wherein each of the estimating first CSI and the estimating second CSI is made using a channel model including a correlation kernel describing a correlation within the millimeter wave network between incoming and outgoing channels at each cluster, at different locations, and during different time slots.

16. The communications node of claim 15, wherein the estimating first CSI is performed during a first stage of the current time slot t, and the beamforming and the selecting a relay for the next time slot are performed during a second stage of the current time slot t.

17. The communications node of claim 15, wherein:
the millimeter wave cooperative network comprises a plurality of nodes, each node comprising the cluster of relays, each relay configured for beamforming in a link between a respective node and the destination node;
the received signal to be forwarded is associated with the source node and the destination node; and
the network segments traversed by the signal comprise those network segments located on street paths between the source node and the destination node.

18. A computer-implemented method for relay selection at each of a plurality of cooperating nodes within a millimeter wave network configured to spatially diversify a transmitted signal through all sets of consecutive, nonrepeating network segments including non-line-of-sight (NLoS) segments from a source node to a destination node, each cooperating node configured to forward a respective received signal toward the destination node via respective network segments including the NLoS segments, each cooperating node comprising a respective cluster of relays configured for beamforming in a link between the each cooperating node and the destination node, the method comprising:

during a current time slot t, estimating first Channel State Information (CSI) associated with a currently selected relay and estimating second CSI associated with the network segments including NLoS segments traversed by the received signal;

during the current time slot t, performing beamforming at the currently selected relay using beamforming weights determined in accordance with a corresponding contribution to Signal-to-Interference+Noise Ratio (SINR) of a current time slot signal V(t) received at the destination node; and during the current time slot t, selecting a relay for a next time slot t+1 in accordance with the second estimated CSI associated with a maximized minimum mean square error (MMSE) predictor of a SINR of a next time slot signal V(t+1) received at the destination node;

wherein each of the estimating first CSI and the estimating second CSI is made using a channel model including a correlation kernel describing a correlation within the millimeter wave network between incoming and outgoing channels at each cluster, at different locations, and during different time slots.

19. A non-transitory computer readable medium storing instructions which, when executed by a computing device, cause the computing device to perform a method of relay selection at each of a plurality of cooperating nodes within a millimeter wave network configured to spatially diversify a transmitted signal through all sets of consecutive, nonrepeating network segments including non-line-of-sight (NLoS) segments from a source node to a destination node, each cooperating node configured to forward a respective received signal toward the destination node via respective network segments including the NLoS segments, each cooperating node comprising a respective cluster of relays configured for beamforming in a link between the each cooperating node and the destination node, the method comprising:

during a current time slot t, estimating first Channel State Information (CSI) associated with a currently selected relay and estimating second CSI associated with the network segments including NLoS segments traversed by the received signal;

during the current time slot t, performing beamforming at the currently selected relay using beamforming weights determined in accordance with a corresponding contribution to Signal-to-Interference+Noise Ratio (SINR) of a current time slot signal V(t) received at the destination node; and during the current time slot t, selecting a relay for a next time slot t+1 in accordance with the second estimated CSI associated with a maximized minimum mean square error (MMSE) predictor of a SINR of a next time slot signal V(t+1) received at the destination node;

wherein each of the estimating first CSI and the estimating second CSI is made using a channel model including a correlation kernel describing a correlation within the millimeter wave network between incoming and outgoing channels at each cluster, at different locations, and during different time slots.

* * * * *